Nov. 9, 1965  J. M. MORRIS ETAL  3,216,557
FEEDER CONTROL FOR BATCH WEIGHING
Filed July 6, 1961  2 Sheets-Sheet 1

INVENTORS.
ROBLEY W. EVANS
JOHN M. MORRIS
BY
Marshall & Wilson
ATTORNEYS

Nov. 9, 1965    J. M. MORRIS ETAL    3,216,557
FEEDER CONTROL FOR BATCH WEIGHING

Filed July 6, 1961    2 Sheets-Sheet 2

INVENTORS.
ROBLEY W. EVANS
BY   JOHN M. MORRIS
*Marshall & Wilson*
ATTORNEYS

United States Patent Office 3,216,557
Patented Nov. 9, 1965

3,216,557
FEEDER CONTROL FOR BATCH WEIGHING
John M. Morris, Louisville, Ky., and Robley W. Evans, New Albany, Ind., assignors to Rex Chainbelt Inc., a corporation of Wisconsin
Filed July 6, 1961, Ser. No. 122,286
5 Claims. (Cl. 198—220)

This invention relates to vibratory conveyors and vibratory feeders and in particular to control means for quickly varying the amplitude of vibration and rate of feed of the feeder.

Vibratory feeders have often been used in batching operations where it is necessary to feed out a predetermined quantity of material and then interrupt feed until that particular increment of material has been disposed of. In this type of service the vibratory feeder normally discharges into a container carried on a weighing scale and control means operable by the scale when the load reaches predetermined amounts first decreases the rate of feed of material into the container and then when the exact weight is finally reached cuts off or stops the flow of material. Electromagnetically driven vibratory conveyors have, except for limited capacity, been the most satisfactory means of feeding granular or particulate material into a container in such a process. The electromagnetic drives were particularly suitable for this purpose because of the ease of control by which the drive could be quickly started and stopped and also because of the ease with which the power input to the vibratory drive could be varied to control the rate of feed.

Vibratory conveyors or feeders driven by rotating eccentric weights or crank and connecting rod mechanisms were not suitable for feeding material into a batch process because it is impossible to rapidly vary or change the amplitude of vibration and thus the rate of feed in controlled amounts.

The principal object of this invention is to provide a control for an eccentric weight driven vibratory feeder that permits the amplitude of vibration and rate of feed to be instantly adjusted or stopped in accordance with signals from a weighing scale or similar device.

Another object of the invention is to provide a system of amplitude control for a vibratory feeder in which the frequency of operation is not varied with changes in amplitude of the vibration.

A still further object of the invention is to provide a tuned vibration exciter for a vibratory feeder in which the amplitude of vibration may be varied very rapidly without changing the frequency of operation of the exciter.

A still further object of the invention is to provide a control means for an eccentric weight driven resonant vibratory feeder in which several widely different rates of feed may be instantly selected and each of which rates may be independently adjusted independently of the selecting means.

These and more specific objects and advantages are obtained from a vibratory feeder control constructed according to the invention.

According to the invention a vibratory feeder or conveyor is resiliently mounted and is driven by an eccentric weight driven exciter member or mass that is connected to the feeder or conveyor by resilient means that include at least one air spring that is inflated to a pressure such that the vibratory system is resonant at or near the operating speed and which is connected to a reservoir or opposing air spring by valved conduit means including at least two valves arranged so that the communication between the air spring and its reservoir or opposing spring may be instantly varied in steps each of which is individually adjustable.

A preferred form of the invention is illustrated in the accompanying drawings.

Figure 1:
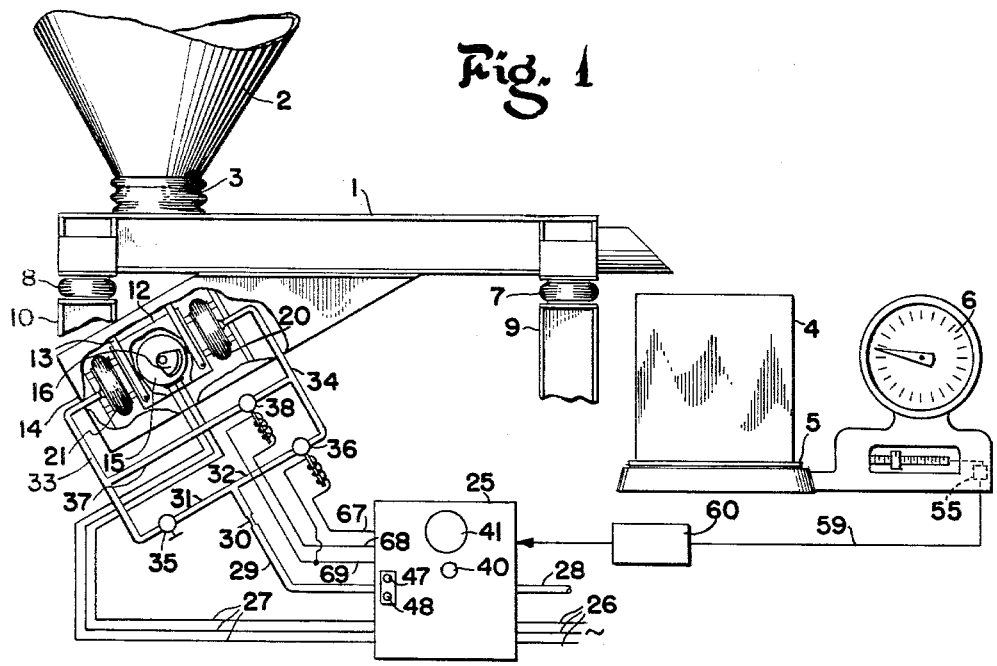
FIG. 1 is a schematic side elevation and schematic diagram of a vibratory feeder constructed according to the invention and incorporated in a batching system.

These specific figures and the accompanying description are intended merely to illustrate the invention and not to impose limitations on its scope.

In a batching system employing a vibratory feeder controlled according to the invention a vibratory feeder 1 is arranged to accept material from a chute or hopper 2 directly or through a flexible connection 3 and deliver such material to a container or hopper 4 mounted on a scale platform 5. The container or hopper 4 and scale platform 5 are illustrated in simple form only since may variations may be made to accommodate the system to various conditions. In many processes the receiving hopper or container similar to the container 4 is suspended from an overhead weighing system. The weight of material accumulated in the container 4 is indicated on a scale dial 6.

The vibratory feeder or conveyor 1 is preferably mounted on vibration isolating mountings 7 and 8 supported from the tops of columns 9 and 10. Alternative forms of mounting such as flexible suspension cables from overhead supports may also be employed. The feeder 1 is vibrated by a vibration exciter that includes an exciter mass 12 that is guided by parallel links 13 in a downwardly inclined housing portion 14 of the conveyor or feeder 1. The exciter member 12 includes an electric motor 15 having eccentric weights 16 mounted on the ends of its armature shaft. The armature shaft of the motor 15 constitutes a shaft journaled in the exciter member 12 while the motor constitutes a particular means for rotating the shaft at a constant speed. Alternative arrangements may include a separately mounted motor that is belt connected to a shaft journaled in the exciter member and carrying the eccentric weights.

Figure 6:
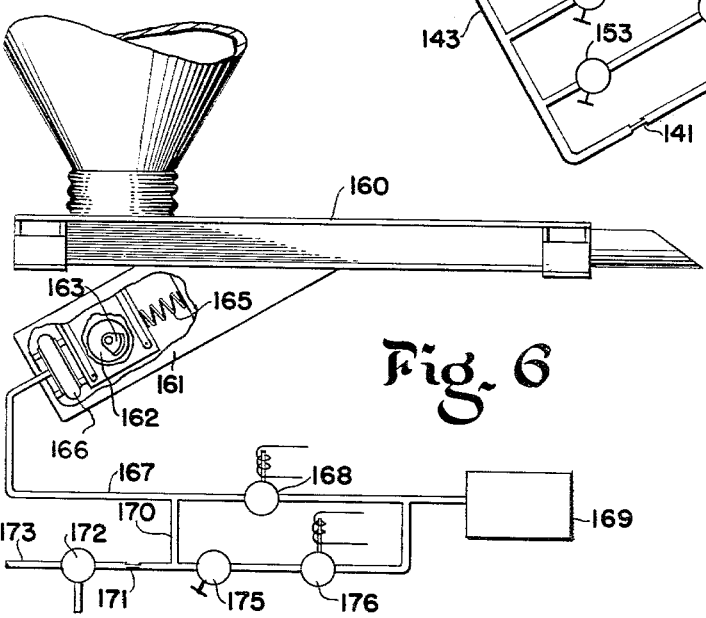
FIG. 6 is another diagrammatic illustration of a feeder constructed with a slightly different control system embodying the features of the invention.

The exciter member 12 is resiliently coupled to the housing 14 by a pair of air springs 20 and 21. Preferably the air springs are employed in pairs the members of each pair being in opposition to each other although a similar type of control may be provided using a single air spring and other resilient means such as a coil spring in place of one of the air springs shown in FIG. 1. Such an arrangement is shown in FIG. 6.

The control for the air springs 20 and 21 includes a panel 25 in which a suitable starting relay for the motor 15 may be installed together with pressure regulating means for supplying air or other gas under pressure to the air springs. Thus the electrical power supplied over leads 26 after passing through a motor starter relay in the control panel 25 is fed through leads 27 to the motor 15. Air or other gas under pressure supplied through a pipe 28 passes through a pressure regulator included in the control panel 25 and thence through pipe 29, restriction 30, branch pipes 31 and 32 to pipes 33 and 34 leading directly to the air springs 21 and 20 respectively. A manually operated valve 35 installed in the pipe 31 limits the gas flow through this pipe while a solenoid operated valve 36 installed in the pipe 32 serves to open or close this pipe and thereby permit or shut off the circulation of air or other gas between the air springs by way of these pipes and valves. Another pipe 37 that includes a solenoid operated valve 38 is connected between the pipes 33 and 34 so that when the valve 38 is opened there is relatively free communication between the air springs connected by the pipes 33, 34 and 37.

In the operation of this equipment the air pressure in the pipe 29 and hence in the air springs 20 and 21 is controlled by the pressure regulator in the control panel 25 which has its adjusting knob 40 projecting from the front face of the control panel 25. A pressure gage 41 connected to the output side of the pressure regulator indicates the air pressure or gas pressure applied to the air springs.

It is a characteristic of the air springs that the effective spring rate of a pair of springs or of a single spring varies directly as the average pressure of the gas in the spring. The force exerted by the spring when inflated with a given quantity of air or gas also varies inversely as the height or extension of the spring. As the result of this inverse force-pressure relation for a constant quantity of gas the springs during vibrating condition individually exhibit a nonlinear rate. However, this is of little consequence because when two such springs are used in opposition to each other, as illustrated in FIG. 1, the nonlinearity of one cancels the nonlinearity of the other so that the combination exhiibts a substantially linear spring rate which does not vary over the stroke of the vibration. When a single spring is used in opposition to a fixed rate spring such as a coil spring the nonlinear rate of the air spring merely means that the vibration cycle is not exactly symmetrical.

In the arrangement as illustrated the air pressure in the springs is selected so that the natural frequency of the exciter member 12 on the air springs 20 and 21 is slightly higher than the operating speed of the motor 15. When the valves 36 and 38 are both closed the system exhibits a small or negligible amount of damping and the amplitude of vibration builds up as the result of the resonance condition between the speed of the motor and the natural frequency of the exciter mass 12 on the springs 20 and 21. When operating in this near resonance condition the amplitude of vibration is sufficient to cause rapid feeding of material on the vibratory deck 1.

When it is desired to decrease the rate of feed, for example to provide a dribble feed to slowly add the last increment of material into the hopper 4 to reach a desired weight, the valve 36 is opened to allow a certain amount of communication and transfer of air or gas from one of the air springs to the other during each vibratory cycle. This flow of gas has two effects. First, it tends to slightly reduce the spring rate of the air springs and thus slightly lower the natural frequency of the system. This by itself would tend to increase the amplitude of vibration. Second, the cyclic flow of air through the valves introduces damping in the system which limits or actually reduces the amplitude of vibration. The amount of such reduction is controlled by the degree of opening of the valves, in particular the valve 35 since the solenoid valve 36 is arranged to either be opened or substantially closed.

When it is desired to stop the feeding of the conveyor the second solenoid valve 38 is opened to allow relatively free air flow from one of the air springs to the other. This has the effect of still further reducing the natural frequency and introducing still more damping into the system so that the amplitude of vibration of the conveyor then is so small that the material does not feed. It may be noted that the motor 15 continues to run at the same speed during this entire sequence.

It is not desirable to stop the motor 15 when it is desired to stop the feeding of material because the system goes through relatively large low frequency vibrations as the motor speed drops through the natural frequency determined by the mass of the conveyor and the stiffness or spring rate of the isolating springs 7 and 8. This relatively large low frequency vibration tends to feed an uncontrollable quantity of material off the end of the conveyor thus destroying the accuracy of the batch weight accumulated in the hopper 4 . However, by leaving the motor running the system quiets down rapidly to a no feed condition without any uncontrolled discharge of material.

Figure 2:
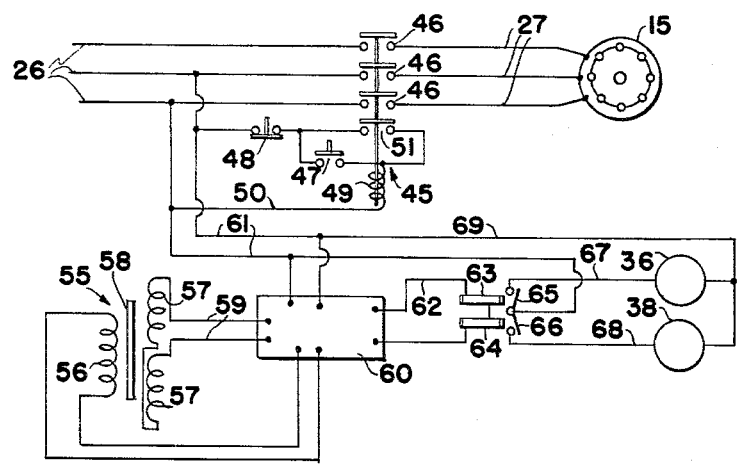
FIG. 2 is a schematic wiring diagram of the electrical controls included in the feeder control constructed according to the invention.

The electrical circuits included in the apparatus constructed according to the invention are illustrated in FIG. 2. These circuits include the power supply leads 26 that enter the control panel 25. A motor starter relay 45 included in the panel has contacts 46 in the leads to the motor 15. This motor starter relay is controlled by start button 47 and stop button 48 so arranged that when the start button 47 is pushed current may flow from one of the leads 26 through the normally closed stop button 48, the now closed start button 47 and a coil 49 of the motor starter relay 45 thence back through a lead 50 to another of the leads 26. As soon as the motor start relay 45 picks up in response to this current flow through its coil 49 it closes its contacts 51 to complete a circuit in parallel with the start button contacts 47.

The circuits for controlling the solenoid valves 36 and 38 include a pickup device 55 which, for illustrative purposes only, is shown as comprising a linear differential transformer having a primary coil 56 and series connected secondary coils 57. The secondary coils are connected in opposition so that when the armature 58 of the transformer is centrally located equal and opposite voltages are generated in the secondary coils 57 and no signal is fed over leads 59 to an amplifier 60.

The amplifier 60 as illustrated in FIG. 2 is energized from the power leads 26 through a branch circuit including leads 61. The amplifier 60 also through its output lead 62 controls a pair of relays 63, 64 having contacts 65 and 66 arranged, when closed, to pass current from one of the leads 61 through leads 67 or 68 to the solenoids of the solenoid valves 36 and 38 respectively. The return circuit from the solenoids 36 and 38 is through a lead 69 connected to the other one of the leads 61.

In this arrangement the armature 58 of the pickup device 55 is connected to a portion of the scale mechanism so that the position of the armature relative to the primary and secondary windings corresponds to the indication of weight as it appears on the dial 6. The output signal from the amplifier 60 which corresponds to the signal received from the pickup device 55 is arranged to operate the relays 63, 64 sequentially when weights corresponding to the first cutoff and final cutoff for the weighing system are reached. The first cutoff is arranged to occur when the accumulated material in the container 4 is close to but not quite equal to the desired batch weight. When this quantity of material is reached the feeding rate is decreased to a slow or dribble feed so that the final cutoff may occur exactly when the desired quantity of material is accumulated in the container 4. Thus the major portion of the material is fed into the container at a rapid rate and the last few increments at a much slower rate so that the weighing mechanism may have ample time to respond to the increments of weight and operate the pickup device 55 when the exact quantity of material has been accumulated. Preferably the relay 63 is adjusted so that it operates a predetermined number of weight units in advance of the operation of the final cutoff. When the relay 63 operates to close its contacts 65 the solenoid valve 36 is energized to open and thereby permit some circulation of air between the air springs 20 and 21 to introduce damping and reduce the amplitude of vibration. Then when the second relay 64 operates it closes its contacts 66 to energize the solenoid valve 38 which still further detunes the vibratory system and results in a complete cutoff of the feeding of material from the feeder 1 into the container 4.

Various other types of signal pickup devices and amplifiers may be employed, the only requirement being that the approach to and arrival at the desired batch weight, as indicated by the scale, shall result in the operation of the valves 36 and 38 at the corresponding times. The signal transmission mechanism may be entirely pneumatic by use of pneumatic relays. A pneumatic system may be preferable when the apparatus is to be operated in an explosive atmosphere. Under some conditions where extreme accuracy is not required simple electrical contacts may be employed in the weighing mechanism to operate the relays 63 and 64 as the weight of material reaches the predetermined first and second cutoff weights.

Figure 3:
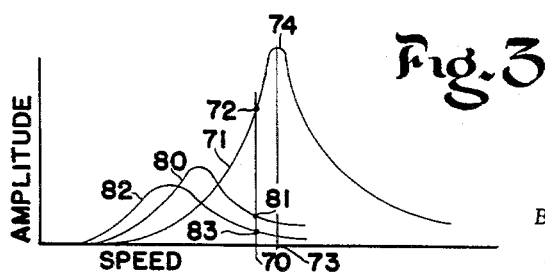
FIG. 3 is a graph illustrating the operation of a feeder employing the improved controls.

FIG. 3 illustrates in graphical form the amplitude of vibration of the feeder 1 with respect to the speed of operation of the motor 15 when both solenoid valves are closed, with one opened, and with both opened. In this diagram the normal operating speed of the motor 15 is indicated by a point 70 on the base line of the graph. When both solenoid valves 36 and 38 are closed and proper gas pressure is maintained in the air springs 20 and 21 by proper adjustment of the regulator control 40, the amplitude of vibration, which changes with motor speed as indicated by a curve 71, is represented by a point 72, the intersection of the curve 72 and the ordinate through the point 70. It may be noted that the peak amplitude of vibration is not reached but would be reached if the motor speed were increased slightly to correspond to the resonant frequency of the air spring and conveyor system, which frequency is indicated by a point 73 on the axis of the graph. This relationship is selected because the energy losses and reaction of the material 1 on the conveyor feeder 1 tend to reduce the natural or resonant frequency of the vibratory system thus bringing it closer to the operating speed of the motor thus tending to increase the amplitude of vibration.

When the first solenoid valve 36 is opened so that some of the air or other gas may circulate from one of the air springs to the other in response to the pressure changes with vibration, the rate of the air springs is reduced and damping is introduced to reduce the amplitude of vibration. Upon larger openings of the valves allowing larger amounts of circulation the natural frequency drops more rapidly with lesser changes in the damping characteristics which result in a resonance curve much as indicated by the curve 80 of FIG. 3. Since the operating speed is not changed by this adjustment the resulting amplitude of vibration drops to an amplitude indicated by a point 81 on the curve 80 which shows a substantially smaller amplitude than that represented by the point 72 corresponding to full rate delivery. By adjustment of the valve 35 the restriction through the path opened by the valve 36 is adjusted so that the resulting amplitude of vibration is just sufficient to cause reliable feeding of material at a slow rate.

When the quantity of material accumulated in the container 4 corresponds to desired batch weight the second relay 64 operates to open the valve 38 thus allowing relatively free communication between the air springs. When this occurs the operation of the system is substantially according to the curve 82 of FIG. 3 which crosses the operating speed ordinate at a point 83 indicating small amplitude of vibration that is insufficient to convey material on the conveyor.

Since these changes in amplitude of vibration are effective without changing the quantity of air in the air spring system but rather by relatively instantaneous changes in the spring rate and damping characteristics it follows that the amplitude of vibration of the system varies from one level to another almost instantly in response to operation of the valves. This is very desirable because it reduces to a minimum the time lag and uncertainty in the response of the conveyor to the weight signals.

Figure 4:
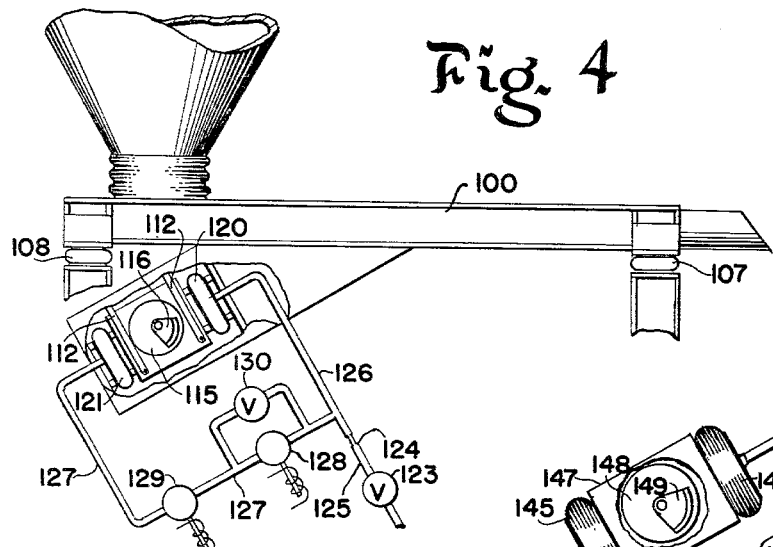
FIG. 4 is a side elevation of a feeder similar to that shown in FIG. 1 but employing a slightly different arrangement of valves in the control system.

FIG. 4 shows a vibratory feeder with a slightly different arrangement of the valving and piping for the air springs. In this arrangement a conveyor 100, that is mounted on vibration isolators 107 and 108, is driven by a vibration exciter 112 that includes a motor 115 provided with eccentric weights 116. The exciter 112 is vibrationally coupled to the conveyor or feeder 100 by at least one and preferably a pair of air springs 120 and 121. Air is supplied to the air springs 120 and 121 through a pressure regulator 123 and restriction 124 installed in a pipe 125. From the restriction 124 a pipe 126 leads to the air spring 120 while a second pipe 127, that includes solenoid valves 128 and 129, leads to the second air spring 121. The solenoid operated valves 128 and 129 are effectively in series. The valve 128 is provided with a bypass valve 130.

In this arrangement the solenoid valve 129 opens when the rate of feed is being reduced from the maximum rate to the dribble rate. When the valve 129 opens with the valve 128 still closed air circulates from one air spring to the other by way of the piping, valve 129 and the bypass valve 130. Manual adjustment of the bypass valve 130 adjusts the dribble rate of feed of the feeder. When it is desired to stop the flow of material the valve 128 is also opened, the valve 129 being kept open, so that air may flow freely from one of the air springs to the other in response to the vibratory forces. When this occurs the effective spring rate of the combination of air springs is reduced to a low value and sufficient damping is introduced so that the exciter 112 is no longer effective in producing vibration of the feeder 100.

It may be noted that in systems such as the systems shown in FIG. 1 and FIG. 4 the solenoid valves 36 and 129 should not close tightly but should provide a small amount of leakage so that when these valves are de-energized and nominally closed there is still sufficient air circulation between the air springs to adjust their average pressure. This does not materially interfere with the operation of the air springs as true springs in producing a maximum vibratory effort of the exciter 12 or 112 in driving the associated feeders.

Figure 5:
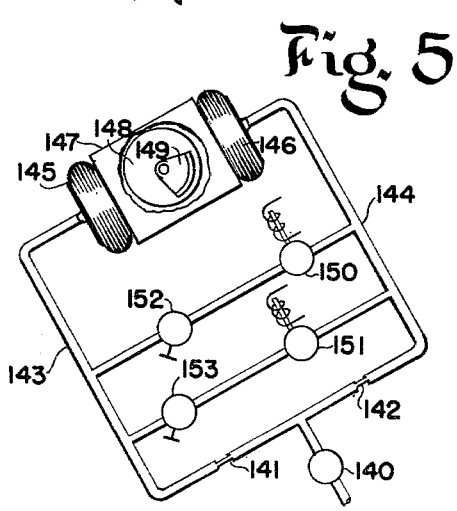
FIG. 5 is a diagram of a modified valving arrangement for use in the improved control system.

FIG. 5 illustrates another variation of the piping and valving for the air springs. In this arrangement air supplied through a pressure regulator 140 passes through restrictions 141 and 142 leading to pipes 143 and 144 connected directly to air springs 145 and 146 which couple a vibration exciter 147 to a work member to be vibrated (not shown). A motor 148 equipped with eccentric weights 149 provides the vibratory effort. In this arrangement air circulation between the air springs is controlled by a pair of solenoid valves 150 and 151 each of which is connected in series with a manual adjusting valve 152 or 153 in bypasses connecting the pipes 143 and 144. In this arrangement the solenoid valves 150 and 151 may close tightly since the average pressures may equalize by way of the restrictions 141 and 142. Also the manually adjustable valves 152 and 153 provide easy means for adjusting the speed rates in the event the control of several feed rates is required. This particular arrangement offers the additional advantage that the pressure in the pipe connecting the restrictions 141 and 142 remains substantially at the average pressure of the air springs without fluctuating in response to the vibrations. This relieves the pressure regulator 140 of the pulsating pressure to which it would otherwise be exposed.

Still another embodiment of the invention is illustrated in FIG. 6. As shown in this figure a vibratory feeder 160 is driven by a vibration exciter 161 that includes a motor 162 and eccentric weights 163. The exciter 161 is resiliently connected to the feeder 160 by a coil spring 165, representative of a non-adjustable spring, and an air spring 166. The air spring 166 is connected through a pipe 167 and solenoid valve 168 to a pressure reservoir 169. It is also connected through the pipe 167, a branch pipe 170, a restriction 171 and a pressure regulator 172 to a pipe 173 connected to a source of air under pressure suitable for charging the system. Furthermore a bypass line including a manually adjustable valve 175 and a solenoid valve 176 is connected in parallel with the valve 168.

In this arrangement the coil spring 165 has a fixed rate while the air spring 166, by variation in its inflation pressure, may have a rate that is adjustable over a substantial range. The operating inflation pressure is controlled by the pressure regulator 172. For control purposes the air spring is connected to the reservoir 169 by a first path that includes the manually adjustable valve 175 and the solenoid valve 176 to provide restricted communication between the two to reduce the spring rate of the air spring 166 as well as introduce damping into the system to control the amplitude. This provides the first step in the reduction of amplitude. A further reduction in amplitude is provided by opening the solenoid valve 168 to provide relatively free communication between the air spring 166 and the reservoir 169. The opening of the valve 168 has two effects. The principal one is the effective decrease in compression ratio of the air spring 166 because of the communication to the added volume of the reservoir 169. The other effect is the restriction of the pipe 167 and valve 168 to air flow which provides a certain amount of loss and damping in the system.

These combinations of stepwise controlling the operation of a vibratory feeder by electrical or other control signals provides a means for operating a high capacity vibratory feeder instantly and accurately in response to signals from a weighing mechanism or other feed rate measuring system.

Various modifications of the structure may be made without departing from the spirit and scope of the invention.

Having described the invention, we claim:

1. In a vibratory feeder, in combination, a vibratory feeder trough, cushioning means supporting the trough, an exciter member, a shaft carrying eccentric weights journaled in the exciter member, means for rotating the shaft at a generally constant speed, resilient means including at least one air chamber serving as a spring coupling the exciter member to the feeder trough, a second air chamber, conduit means connecting said chambers, a first and a second valve in said conduit means, each of said valves being selectively operable at a fully open position and a substantially closed position, a manually adjustable valve means, said first valve and said adjustable valve means being arranged in series in the conduit means connecting the chambers, said second valve being connected in parallel with at least the manually adjustable valve means to provide a bypass around said manually adjustable valve, said valves and said manually adjustable valve providing at least two levels of opposition to air flow between said chambers in response to vibration of said trough and member, and means for inflating the chambers to adjust the resonant frequency of the vibratory system of exciter member and trough to a frequency which when the valves are closed is slightly greater than said operating speed to vary the tuning and amplitude of vibration of said trough.

2. A vibratory feeder control system according to claim 1 in which said second valve is in parallel with the series combination of the first valve and the manually adjustable valve means.

3. A vibratory feeder control system according to claim 1 in which said second valve is in parallel with only the manually adjustable valve means.

4. A vibratory feeder control system according to claim 1 in which the manually adjustable valve means limits the flow through the first valve.

5. A vibratory feeder according to claim 1 in which the second air chamber is an air spring coupling the exciter member to the feeder trough and operating out of phase with the first air chamber.

References Cited by the Examiner
UNITED STATES PATENTS

| | | | |
|---|---|---|---|
| 2,103,400 | 12/37 | Weckerly | 198—39 X |
| 2,609,965 | 9/52 | Kast | 198—39 X |
| 2,614,786 | 10/52 | Caron et al. | 198—39 X |
| 2,669,344 | 2/54 | Flint | 198—220 |
| 2,801,732 | 8/57 | Gaubert | 198—220 |
| 2,984,339 | 5/61 | Musschoot. | |
| 2,993,585 | 7/61 | Musschoot | 198—220 |

SAMUEL F. COLEMAN, *Primary Examiner.*

JULIUS E. WEST, WILLIAM B. LA BORDE,
*Examiners.*